United States Patent
Tokunaga et al.

(10) Patent No.: US 6,189,589 B1
(45) Date of Patent: Feb. 20, 2001

(54) MOLDING METHOD FOR LAMINATED BODY USING COOLING AIR

(75) Inventors: Kazuhiro Tokunaga; Takashi Tsubosaki; Shoichi Itoh; Hisashi Yamada, all of Kanagawa-ken (JP)

(73) Assignee: Kasai Kogyo Co., Ltd., Kanagawa-ken (JP)

(*) Notice: Under 35 U.S.C. 154(b), the term of this patent shall be extended for 0 days.

(21) Appl. No.: 09/176,226

(22) Filed: Oct. 21, 1998

Related U.S. Application Data

(62) Division of application No. 08/699,853, filed on Aug. 20, 1996, now Pat. No. 5,840,149, which is a continuation of application No. 08/245,114, filed on May 17, 1999, now abandoned.

(30) Foreign Application Priority Data

May 21, 1993 (JP) .................................................. 5-120022
Jul. 5, 1993 (JP) .................................................. 5-165767

(51) Int. Cl.⁷ .............................. B32B 31/20; B28B 3/00
(52) U.S. Cl. .......................... 156/497; 156/580; 156/581; 425/405.1; 425/406; 425/420
(58) Field of Search .................................... 156/212, 214, 156/242, 245, 322, 497, 498, 580, 581, 87, 286; 425/405.1, 406, 420

(56) References Cited

U.S. PATENT DOCUMENTS

| 3,488,413 | 1/1970 | Watts, Jr. . | |
|---|---|---|---|
| 4,131,664 | * 12/1978 | Flowers et al. | 264/510 |
| 4,786,351 | 11/1988 | Elliot et al. . | |
| 4,873,045 | * 10/1989 | Fujita et al. | 264/259 |
| 5,130,071 | * 7/1992 | Iseler et al. | 264/102 |
| 5,372,668 | * 12/1994 | Bracesco | 156/214 |

FOREIGN PATENT DOCUMENTS

04359979 * 12/1992 (JP) .

* cited by examiner

*Primary Examiner*—Michael W. Ball
*Assistant Examiner*—John T. Haran
(74) *Attorney, Agent, or Firm*—Foley & Lardner

(57) ABSTRACT

In a method and molding apparatus for laminated molded bodies, a thermal-molding felt and a thermoplastic resin sheet, respectively in hot and soft condition, are set or placed on a mold face of cold-pressing-molding lower mold. A cold-pressing-molding upper mold lowers onto the lower mold to press the the thermal-molding felt and thermoplastic resin sheet. Simultaneously, cooling air is supplied to center portion of the thermal-molding felt through a blowing pipe protruding from mold face of the thermal-molding felt side and intruding into the felt accelerating circulation of cooling air and cooling of the thermoplastic resin sheet.

7 Claims, 10 Drawing Sheets

MOLDING METHOD FOR LAMINATED BODY USING COOLING AIR

This application is a divisional application of prior application Ser. No. 08/699,853, filed Aug. 20, 1996 now U.S. Pat. No. 5,840,149 which is in turn a continuation of Ser. No. 08/245,114, filed May 17, 1994 now abandoned.

BACKGROUND OF THE INVENTION

1. Field of the Invention

The present invention relates to a molding method and a molding apparatus for a laminated molded body such as insulator dashboards of cars.

2. Description of the Prior Art

Ordinarily, an insulator dashboard having sound insulation function is installed on a dashboard panel facing a car interior, with the dashboard panel placed in front of the driver seat and the passenger seat of a car. The dashboard panel is made of a laminated molded body of a sound insulation material such as a thermoplastic resin sheet and a sound absorption material such as felt and polyurethane foam.

Conventional molding method for the insulator dashboard will be explained on the basis of the drawings of FIG. 19 and FIG. 20.

First, sound absorbing material is heated to 165 to 175° C. measured at its surface through a hot blast heating furnace, the hot material is shaped to its desired shape by cold pressing step and the sound absorption material shaped is cooled, and the material is molded to its precise shape of the dashboard.

Next, as shown in FIG. 19, the sound absorption material 1 of desired shape is set on a lower mold 3 for cold-pressing-molding, and a sound insulating material 2 heated to 130 through 135° C. measured at its surface is placed on the sound absorbing material 1. A cold-pressing-molding upper mold 4 having substantially the same shape or profile as that of the cold-pressing-molding lower mold 3 is placed above the lower mold 3.

Next, as shown in FIG. 20, the cold pressing molding upper mold 4 is lowered, a pressing pressure of 15 to 30 kg/cm² is applied between the lower mold 3 and the upper mold 4 for in order to mold the sound absorbing material 1 and the sound insulation material 2, a predetermined cooling period is elapsed, a second pressing (pressure: 100 to 150 kg/cm²) is done in order to trim or cut the circumference or the outer periphery of the product by means of trimming blade 8 provided around the circumference of the cold-pressing-molding upper mold 4.

Then, a water-jet cutting device or special purpose mold is used to carry out a trimming or piecing the process completing the molding of products.

According to the conventional molding method for insulator dashboards, after the sound absorbing material 1 is shaped in a desired shape by means of a press mold, a different press mold is used to press the sound insulation material 2 and the sound absorbing material 1, so that it is necessary to employ two steps of pressing and to prepare plural mold installations.

In addition, it has been difficult to control the pressure level in pressing of the sound insulation material 2 and the sound absorbing material 1. When the pressure level is too high, the sound absorbing material 1 may be crushed the resulting in failure of obtaining appropriate thickness of the product. On the contrary, if pressure level is too weak, one of the sound insulation material 2 and the sound absorbing material 1 may be peeled from other one.

Still, according to the prior art, the elasticity of the sound absorption material 1 prevents the pressing pressure from being appropriately transferred to the sound insulation material 2, making it difficult to precisely or sharply shape the of corners of the product.

Additionally, the sound absorbing material 1 is typically made of a thermal-molded felt having thermal insulation quality. Thus, it takes a long time to cool the molded sound absorbing material 1, requiring a longer molding cycle.

SUMMARY OF THE INVENTION

The present invention relates to a forming and molding method of a laminated product of a laminated bodies formed of a sound insulating material made of thermoplastic resin sheet and a sound absorbing material made of a thermal-molding felt. The method comprises the steps of mounting the thermal-molding felt and the thermoplastic resin sheet in a heated and soft state on a lower mold for cold pressing and molding, lowering an upper mold for cold pressing and molding onto the lower mold, pressing and molding the thermoplastic resin sheet and the thermal-molding felt integrally with a predetermined clearance left between the upper mold and the lower mold for cold pressing and molding, and supplying cooling air into the thermal-molding felt through pressed air holes in order to accelerate the molding process of the thermoplastic resin sheet and the cooling process of the thermal-molding felt.

Also, the present invention relates to the forming and molding method of laminated products or laminated molded bodies according to claim 1, wherein the sound insulating material is made contact with a mold face of the thermoplastic resin sheet side through a vacuum suction hole formed in a mold at the thermoplastic resin sheet side.

Still also, the present invention relates to the molding method of laminated products wherein air is blown through a blowing pipe provided with a front end protruded from the mold face of thermal-molding felt side and intruded in the thermal-molding felt in order to help mold the sound insulation material and simultaneously forcibly cool the thermal-molding felt.

Still also, the present invention relates to the molding method of laminated product according to claim 1, wherein air supplied in the thermal-molding felt through the blowing pipe is exhausted from a circumferential portion, and simultaneously exhausted to the outside through vacuum suction holes provided at suitable locations of the mold face at the thermal-molding felt side.

Still also, the present invention relates to the molding method of a laminated product of a laminated body formed of a sound insulation material made of a thermoplastic resin sheet and a sound absorbing material made of a thermal-molding felt. The method comprises the steps of preheating the cold-pressing-molding molds and the materials, setting and mounting the thermoplastic resin sheet and the thermal-molding felt in the heated and soft condition on the lower mold for cold pressing and molding, lowering the upper mold for cold pressing and molding, pressing integrally the thermoplastic resin sheet and thermal-molding felt with a predetermined clearance left between the upper mold and the lower mold for cold pressing and molding, sealing the circumference with a seal member, supplying cooling air in the thermal-molding felt from a plurality of air supply ports provided in the upper mold for cold-pressing-molding, applying predetermined face pressure to the thermoplastic resin sheet in order to press and mold the sound insulation layer and the sound absorbing layer, raising the upper mold for cold-pressing-molding in order to cancel sealed condition of the circumference of the upper mold and the lower mold for cold-pressing-molding, and supplying cooling air in the sound absorbing layer through air supply ports or holes in order to forcibly cool the sound absorbing layer.

Still also, a molding apparatus for a laminated molded body of the present invention consists of a cold-pressing-molding lower mold provided with a predetermined mold face and a cold-pressing-molding upper mold placed above the lower mold in order to press and mold the thermal-molding felt in a predetermined shape, wherein one of these molds for cold-pressing-molding has pressure air holes accelerate cooling of the thermal-molding felt.

Still also, the molding apparatus for a laminated molded body according to claim 6 has vacuum suction holes provided in the other mold for cold-pressing-molding in order to vacuum-mold the thermoplastic resin sheet.

Still also, the molding apparatus for laminated molded bodies according to claim 1 has a blowing pipe provided in other mold for cold-pressing-molding, and a front end of the blowing pipes protrude upwardly from the mold face and adapted to insert in the thermal-molding felt when the laminated molded body is pressed.

Still also, the molding apparatus for laminated molded bodies according to claim 1 has vacuum suction holes provided with the other mold for cold pressing and molding in order to exhaust air supplied from the blowing pipe.

Still also, the molding apparatus for laminated molded bodies according to claims 3 and 5 has a blowing pipe provided with a plurality of supplemental holes formed on the side wall of the blowing pipe in order to forcibly cool the thermal-molding felt.

Still also, the molding apparatus for a laminated molded body consists of a lower mold for cold-pressing-molding having desired molding face or profile and an upper mold for cold-pressing-molding movable up-and-down direction and placed above the lower mold in order to press and mold the thermoplastic resin sheet and the thermal-molding felt in a predetermined shape, wherein a trimming blade having a sealing function and a trimming function is provided on the circumference of the upper mold for cold-pressing-molding.

Consequently, it is a first purpose of the present invention to provide a molding method of laminated molded body to shorten very much molding time by accelerating the molding process of the thermoplastic resin sheet and the cooling process of a laminated molded body.

Still also, it is a second purpose of the present invention to provide a molding method of laminated molded body enabling to shorten manufacturing process, simplify the mold installation and shorten the cooling cycle period resulting in the laminated molded body of good moldability.

Still also, it is a third purpose of the present invention to provide a molding apparatus of laminated molded body enabling to shorten very much the molding time by hastening the molding time of thermoplastic resin sheet and the cooling time of the thermal-molding felt.

Still also, it is a fourth purpose of the present invention to provide a molding apparatus enabling to simplify the mold installation and improve the moldability.

Characteristics of the present invention will be made more apparent by reading the following description described with reference to the accompanying drawings.

DESCRIPTION OF THE PREFERRED EMBODIMENTS

The preferred embodiments of the molding method for a laminated molded body and molding apparatus for the body will be described in detail with reference to the accompanying drawings.

Figure 1:
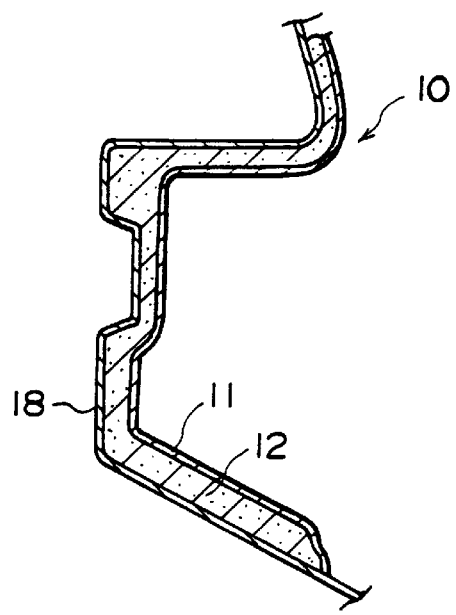
FIG. 1 is a section of a car insulator dashboard manufactured by the molding method of the present invention.

As seen in FIG. 1 depicting a structure of the car insulator dashboard molded by the molding method according to the present invention, the insulator dashboard 10 consists of a sound insulating material 11 made of a relatively high density flexible material such as a rubber sheet or vinyl chloride containing an inorganic filler, and a sound absorption material 12 having a perforated basic material, such as polyurethane foam and felt having a desired sound absorption function. The sound absorption material 12 is integrally applied to a rear face of the sound insulation material 11, resulting in a laminated body that can be used as a insulator dashboard 10. The shape of the insulator dashboard 10 corresponds to that of a dashboard panel 18 facing the car interior because the laminated body of the dashboard 10 is applied and bonded to the dashboard panel 18.

In addition, it is noted that as will be described, the insulator dashboard 10 is cold-pressed, so that the thermoplastic resin sheet is used as that of the sound insulation material 11 and the thermal-molding felt is used as the sound absorbing material 12.

Figure 2:
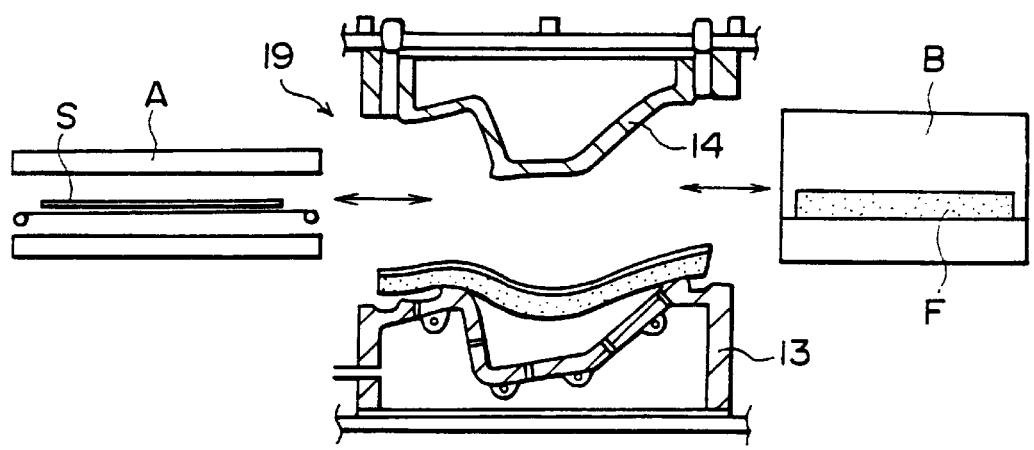
FIG. 2 is a section of molding apparatus according to a first embodiment of the present invention and the materials set.
Figure 3:
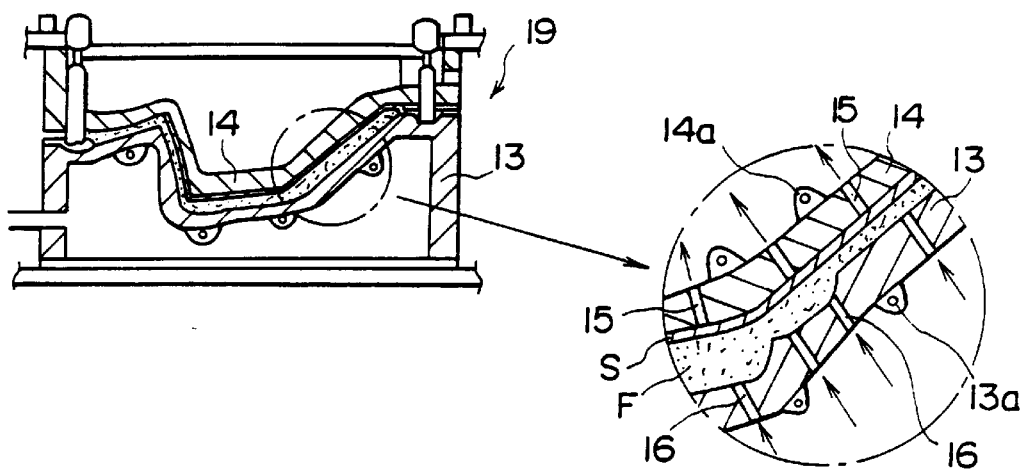
FIG. 3 is a section showing a pressing step of the molding method according to the present invention.

The molding apparatus 19 for molding the insulator dashboard 10 shown in FIG. 1 consists generally of cold pressing molding lower mold 13 and cold-pressing-molding upper mold 14 as shown in FIG. 2.

The cold-pressing-molding lower mold 13 has blowing pressure air holes 16 formed thereon and cooling pipes 13a contained therein. The cold-pressing-molding upper mold 14 placed above the lower mold 13 has vacuum suction holes 15 formed thereon and cooling pipes 14a arranged therein. A sealing cylinder 17 is placed around the circumference of the upper mold 14.

An embodiment of a molding method for an insulator dashboard 10 using the pressing molding apparatus 19 structured as mentioned above will be described.

First, as shown in FIG. 2, a thermoplastic resin sheet S and a thermal-molding felt F, respectively are heated in heating furnaces A and B, and the thermal-molding felt F and the thermoplastic resin sheet S are placed on the cold-pressing-molding lower mold 13 in the order of that above.

Then, the cold-pressing-molding upper mold 14 is lowered in order to press and mold the thermoplastic resin sheet S and the thermal-molding felt F by means of cold pressing molding the upper mold 14 and the lower mold 13.

Circulating the cooling medium through cooling pipes 13a and 14a arranged within the cold-pressing-molding upper mold 14 and lower mold 13, the upper mold and the lower mold are cooled and then the thermoplastic resin sheet S and thermal-molding felt F are cooled. By means of vacuum suction holes 15 formed on the upper mold 14, the thermoplastic resin sheet S comes intimately in contact with a mold face of the upper mold 14. By means of the pressure air holes 16 formed on the lower mold 13, cooling air is supplied into the thermal-molding felt F. Thus, the molding process of thermoplastic resin sheet S is assisted and cooling of the thermal-molding felt F is accelerated.

Figure 4:
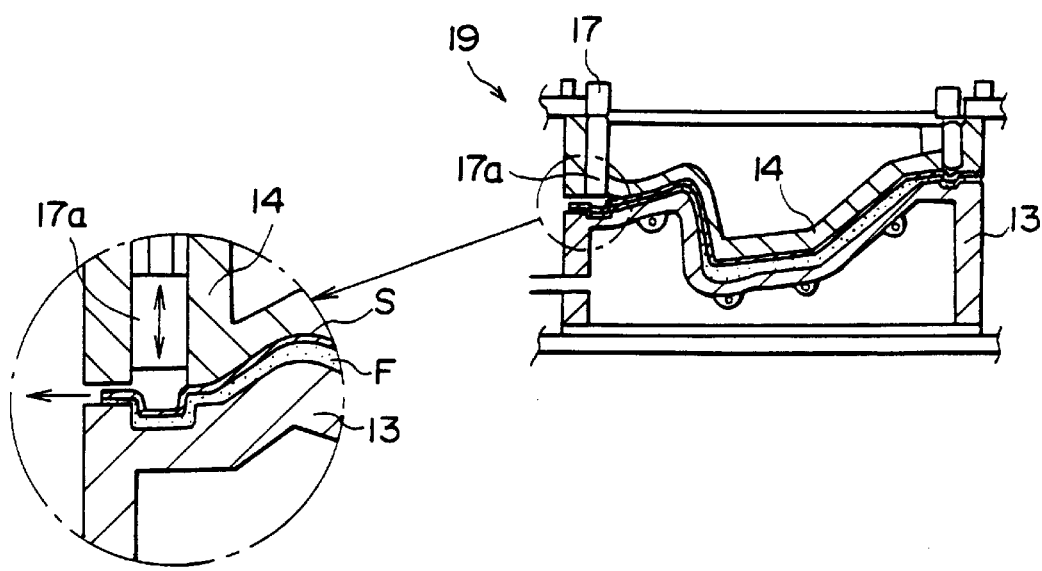
FIG. 4 is a section showing a cooling step for the sound absorbing material in the molding method of the present invention.

At this time, as shown in FIG. 4, circumference sealing cylinder 17 raises the sealing member 17a resulting in displacement of air from the pressure air holes 16.

Next, the second embodiment of the molding method according to the present invention will be described with reference to the drawings concerning the the second embodiment.

Figure 6:
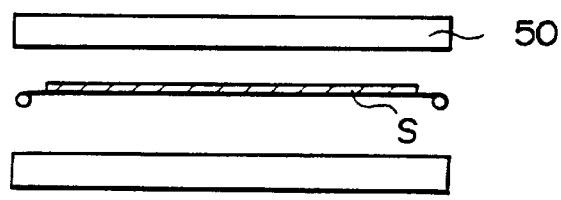
FIG. 6 is a section showing a heating step for the thermoplastic synthetic resin sheet according to the molding method of the present invention.
Figure 10:
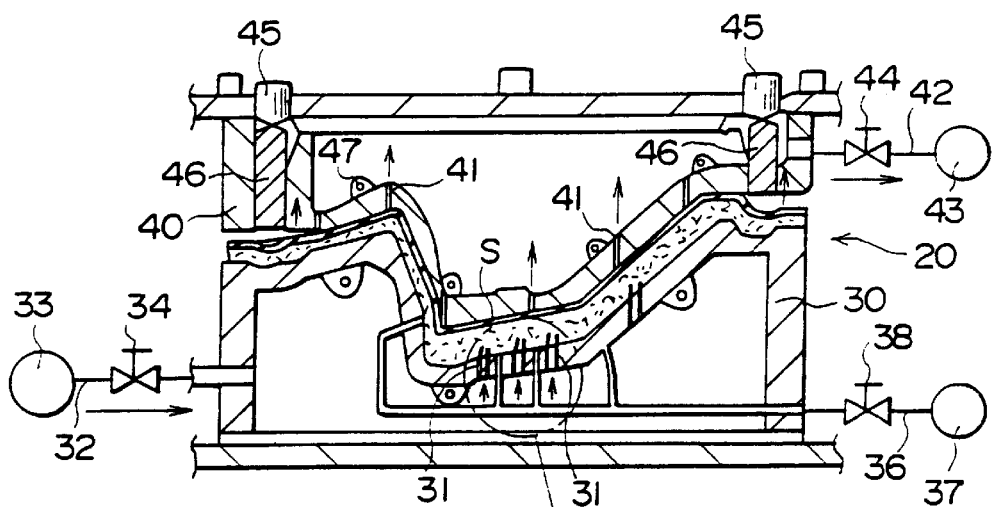
FIG. 10 is a section showing a vacuum air and pressure air molding step of the molding method according to the present invention.
Figure 10:
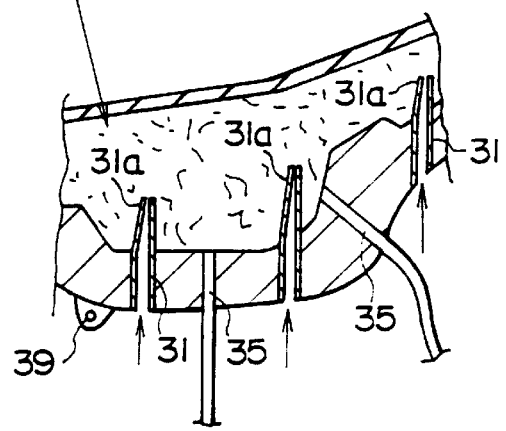
Figure 11:
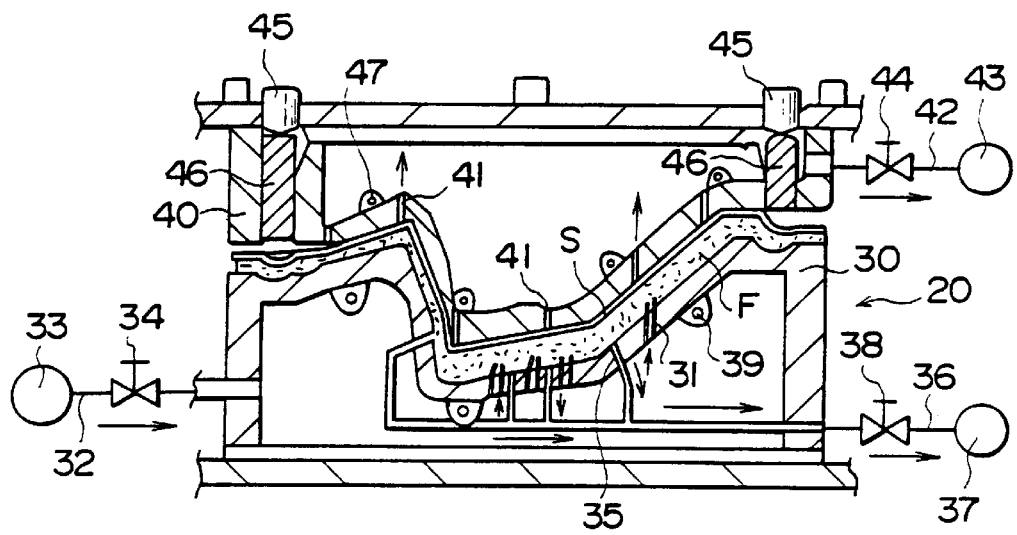
FIG. 11 is a section showing vacuum aeration condition of cooling air according to the molding method of the present invention.
Figure 12:
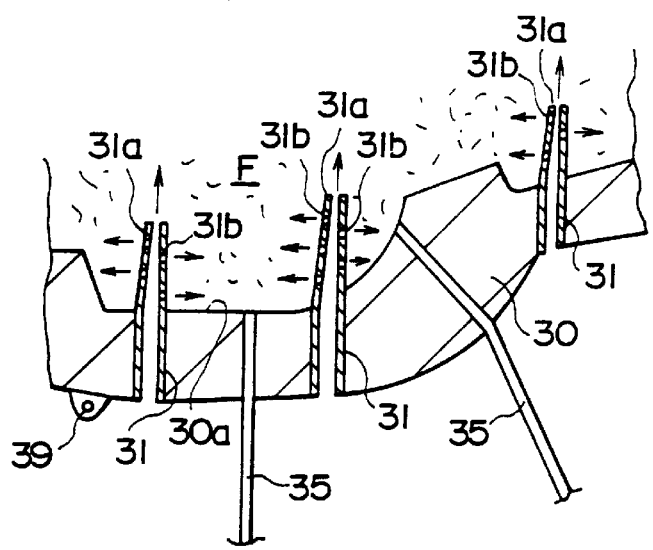
FIG. 12 is a partly sectional view showing structure of a second embodiment of the molding apparatus according to the present invention.

FIG. 6 depicts structure of molding apparatus related to the second embodiment the molding method according to the present invention, FIG. 6 through FIG. 11 depict the respective steps of the molding method, and FIG. 12 shows the structure of the second embodiment of molding apparatus according to the present invention.

Figure 5:
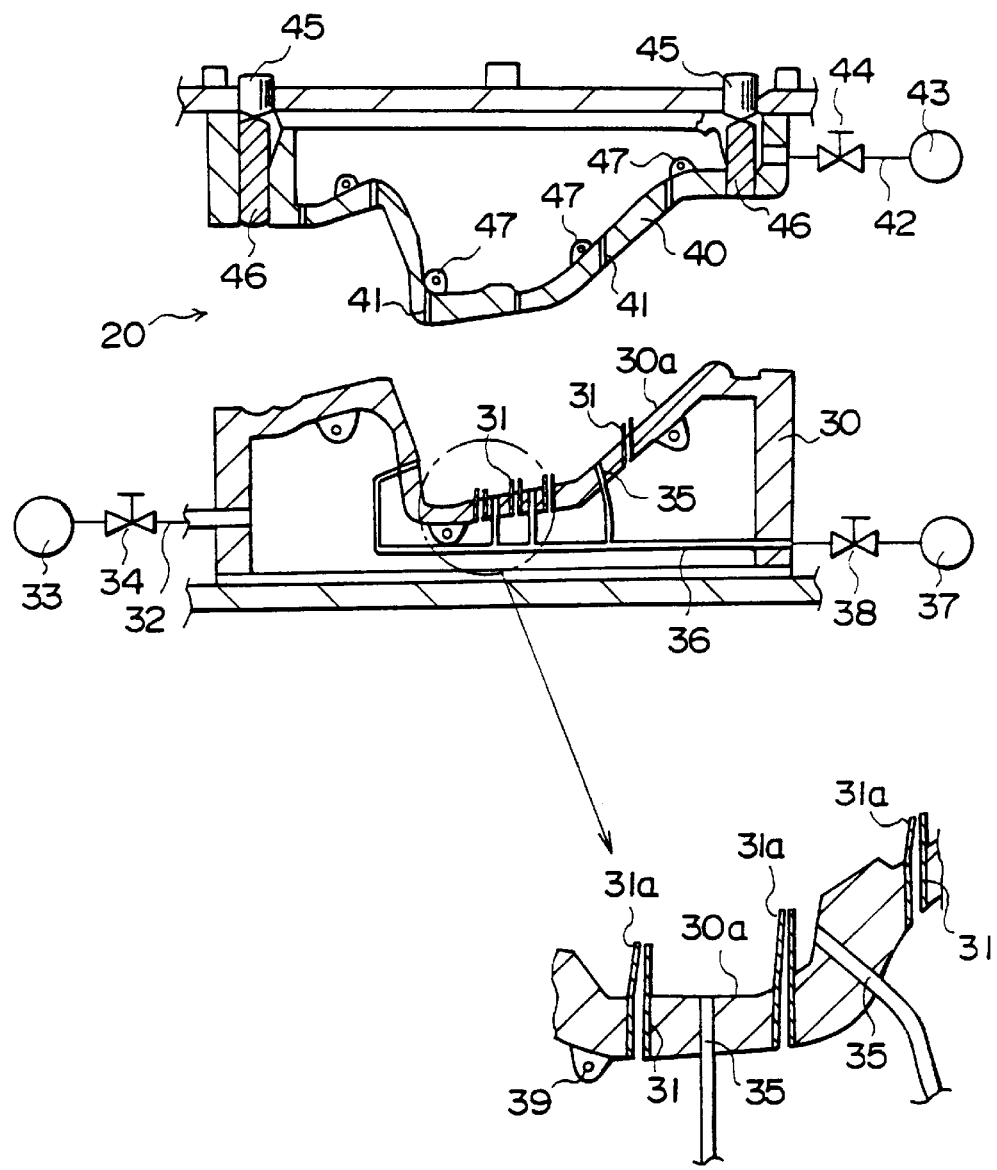
FIG. 5 is a section depicting structure of the molding apparatus according to the second embodiment of the present invention.

The molding apparatus 20 adapted to use and mold the insulator dashboard 10 shown in FIG. 1 consists in general cold-pressing-molding lower mold 30 and cold-pressing-molding upper mold 40 as shown in FIG. 5.

In more detail, the cold-pressing-molding lower mold 30 has blowing pipes 31 arranged so as to protrude their front ends 31a through mold face 30a of the lower mold 30. The blowing pipes 31 are connected to a pressure air pump 33 through a piping 32 provided with an opening valve 34.

Although the blowing pipe 31 can be manufactured from any material, it be preferable that it is made of stainless steel since stainless steel pipe can be mass-produced. As will be described later, the stainless blowing pipe 31 enters into the thermal-molding felt F. Thus, it is preferable that its front end 31a is be tapered.

Additionally, it is preferable to concentrate the blowing pipes 31 on a thick portion of the sound absorbing material 12 of the insulator dashboard 10 considering the cooling efficiency of thermal-molding felt F.

The cold-pressing-molding lower mold 30 has vacuum suction holes 35 formed thereon and connected to vacuum suction pumps 37 through vacuum suction pipes 36. The vacuum suction pipes 36 have an open-and-close valve 38 and the lower mold 30 has cooling pipes 39 for cooling the mold.

The cold pressing molding upper mold 40 placed above the lower mold 30 has vacuum suction holes 41 formed thereon and connected to a vacuum suction pump 43 through vacuum suction pipe 42. The vacuum suction pipe 42 has an open-and-close valve 44.

Sealing cylinder 45 is attached to outer peripheral portion of the upper mold 40. A sealing member 46 attached to the sealing cylinder 45 is connected to the outer peripheral portion of the upper mold 40 so as to move vertically.

The upper mold 40 has cooling pipes 47 for cooling the upper mold 40.

An embodiment of the molding method for insulator dashboard 10 shown in FIG. 1, which method using the pressing molding apparatus 20 structured as mentioned above, will be described.

Figure 7:
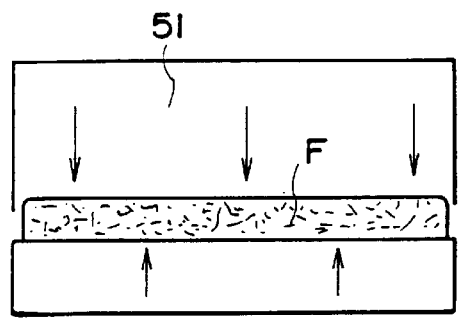
FIG. 7 is a section showing the heating step for the thermal-molding felt according to the molding method of the present invention.

First, a thermoplastic resin sheet S of material for the sound insulator material 11 as shown in FIG. 6, is heated to 130 to 135° C. of its surface temperature by means of infrared heating furnace 50. As shown in FIG. 7, the thermal-molding felt F is heated by a hot blast heating furnace 51 until its inner temperature reaches 165 to 175° C.

Figure 8:
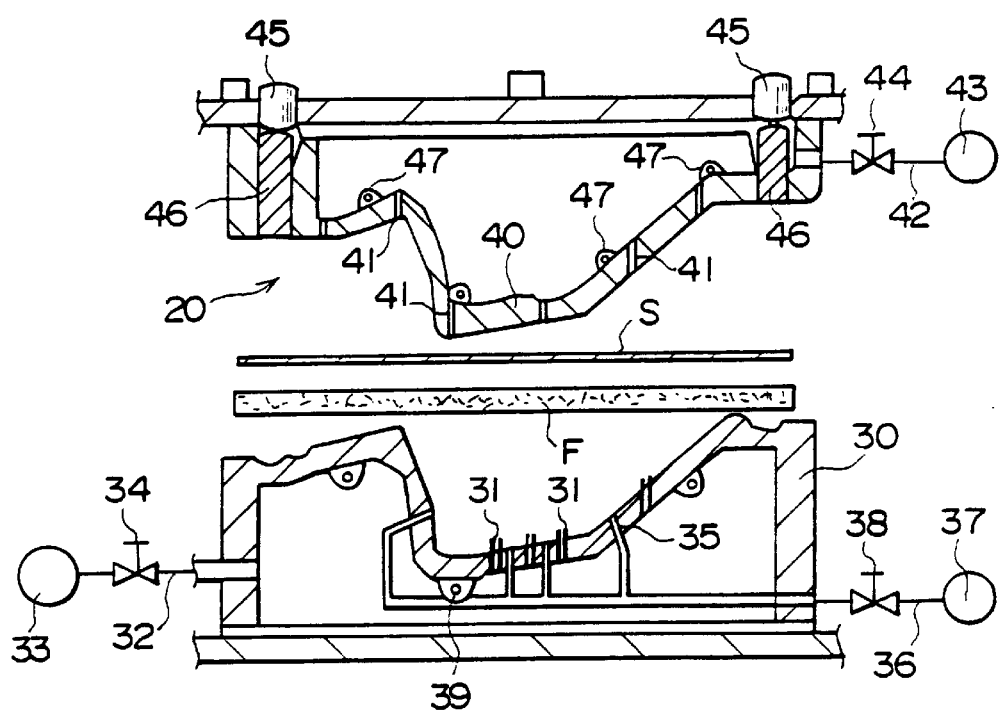
FIG. 8 is a section depicting a material setting step of the molding method of the present invention.

Then, as shown in FIG. 8, the thermal-molding felt F and the thermoplastic resin sheet S, respectively heated and softened are set in order of the above on the mold face of cold-pressing-molding lower mold 30.

Figure 9:
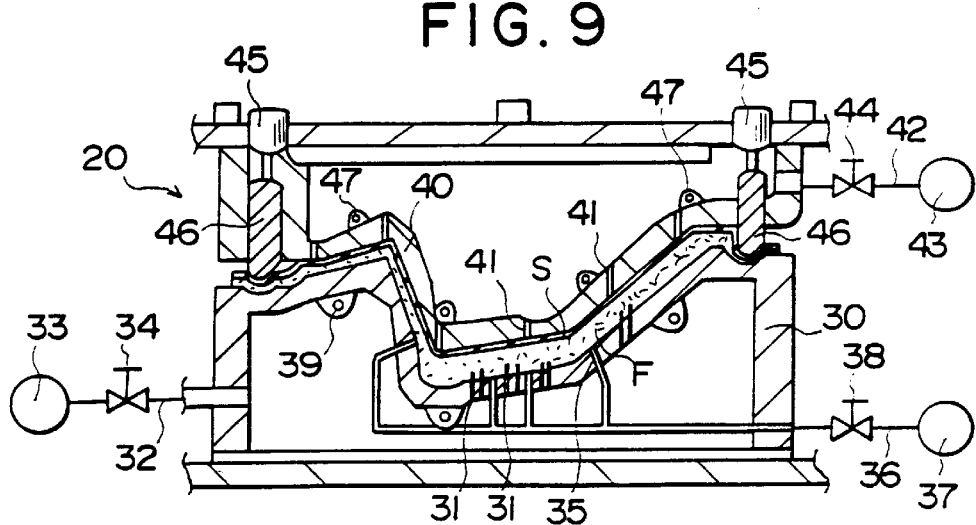
FIG. 9 is a section depicting a pressing step according to the molding method of the present invention.

After respective materials are set, cold-pressing-molding upper mold 40 lowers as shown in FIG. 9, and both the thermoplastic resin sheet S and thermal-molding felt F are placed between and pressed by the cold-pressing-molding upper and lower molds 30 and 40, leaving a predetermined clearance.

While pressing of both the upper and lower molds, the blowing pipe 31 situated under the lower mold 30 intrudes into the thermal-molding felt F. Because the front end 31a of the blowing pipe 31 has shape of taper, the thermal-molding felt F doesn't deform and the blowing pipes 31 effectively enter into the thermal-molding felt F.

Then, as shown in FIG. 10, the opening valve or open-and-close valve 44 opens and the vacuum pump 43 drives, so that the thermoplastic resin sheet S is vacuum-molded in the interior of the upper mold 40. Simultaneously, the opening valve 34 opens in order to supply cooling air from the pressure air pump 33 into the thermal-molding felt F through blowing pipes 31.

Consequently, because the blowing pipes 31 intrude into the thermal-molding felt F at a mid level of its thickness, it is more rapid and easier to circulate cooling air through the interior of the thermal-molding felt F as compared with the first embodiment in which cooling air is supplied through the lower mold molding face. In addition, because pressure air is rapidly applied also to the thermoplastic resin sheet S, it is possible to shorten considerably the molding time necessary for the thermoplastic resin sheet S and cooling time necessary for the thermal-molding felt F.

The sealing cylinder 45 operates at a timing a little shifted from that of supply of cooling air from the pressure air pump 33, and the seal member 46 is raised slightly in order to exhaust cooling air out of the structure.

As described above, supplying of cooling air from the blowing pipes 31 exhaust air, used in pressure air molding of the thermoplastic resin sheet S and the cooling of thermal-molding felt F, through the outer periphery of the mold. If the vacuum pump 38 operates as shown in FIG. 11 to forcibly displace hot air contained in the thermal-molding felt F through the vacuum suction holds 35 formed in the lower mold 30, it is possible to send more fresh cooling air into the thermal-molding felt F, improving cooling efficiency of the felt F.

Furthermore, as depicted in FIG. 12, a plurality of supplemental holes 31b formed on side face of the blowing pipe 31 and consequently cooling air supplied from the front end 31a is sprayed from the supplemental holes 31b in a shape of radiation, improving cooling efficiency of the thermal-molding felt F.

Next, the third embodiment of the molding method according to the present invention will be described with reference to the accompanying drawings.

Figure 13:
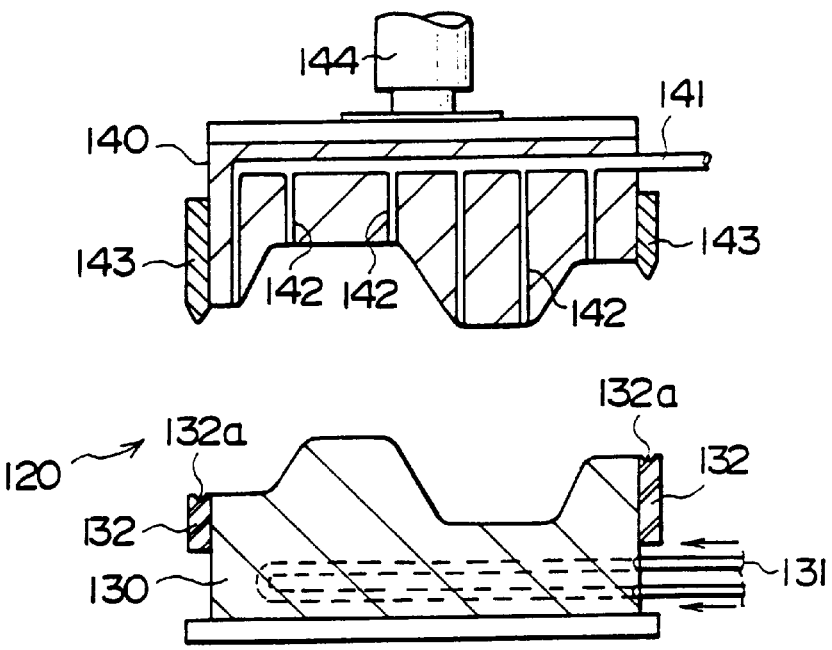
FIG. 13 is a section depicting the structure of the molding apparatus according to the third embodiment of the present invention.

As described in FIG. 13 depicting structure of the molding apparatus of the third embodiment according to the present invention, the cold-pressing-molding lower mold 130 contains cooling pipes 131 and a receiving seat 132 having an upper V groove 132a is provided on the outer side of the lower mold 130.

While, the cold-pressing-molding upper mold 140 above the lower mold 130 has air pressing function, a plurality of air supply ports 142 are formed within the upper mold 140 in order to down-blow cooling air supplied from the air supply piping 141 through mold face of the upper mold 140, and wedge type seal member 143 is provided on the outer periphery of the upper mold 140. In addition, the upper mold 14 is adapted to vertically move by an up-and-down cylinder 144.

In addition, also the upper mold 140 contains cooling pipe (not shown).

Figure 14:
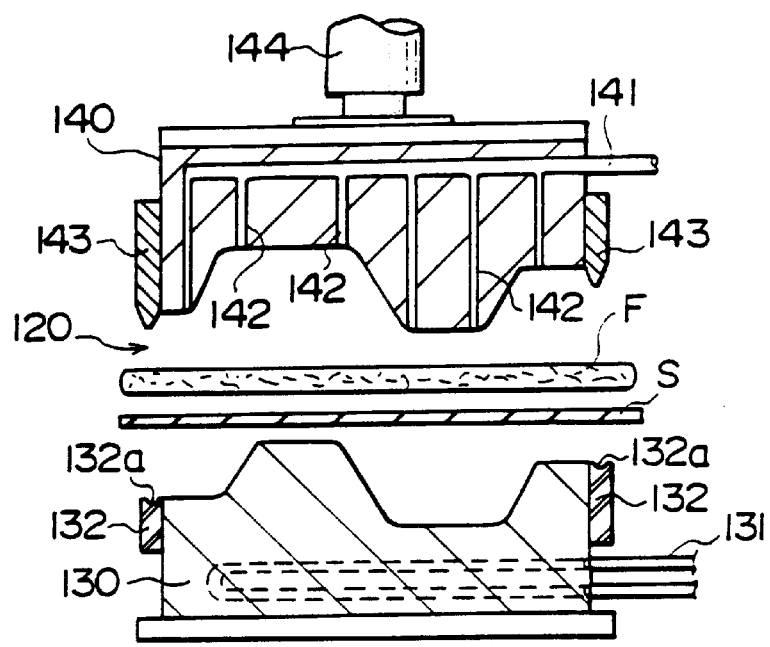
FIG. 14 is a section showing a setting step of materials according to the molding method of the present invention.
Figure 15:
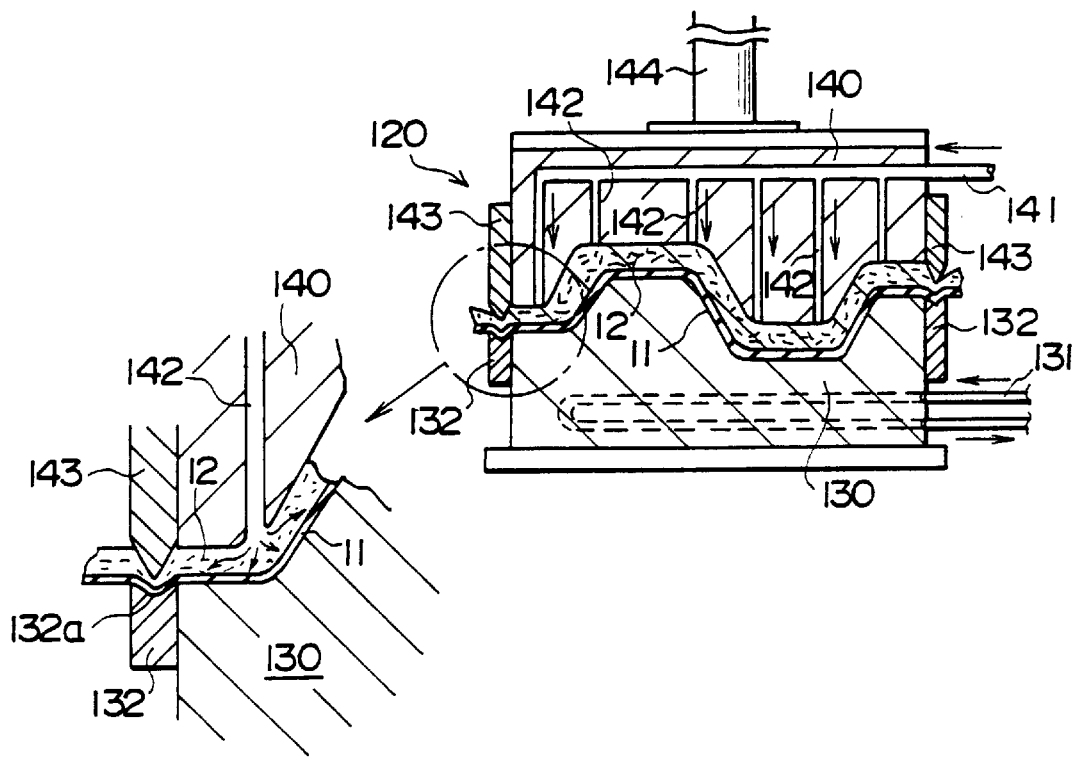
FIG. 15 is a section showing a pressure air and press molding step of the molding method according to the present invention.
Figure 16:
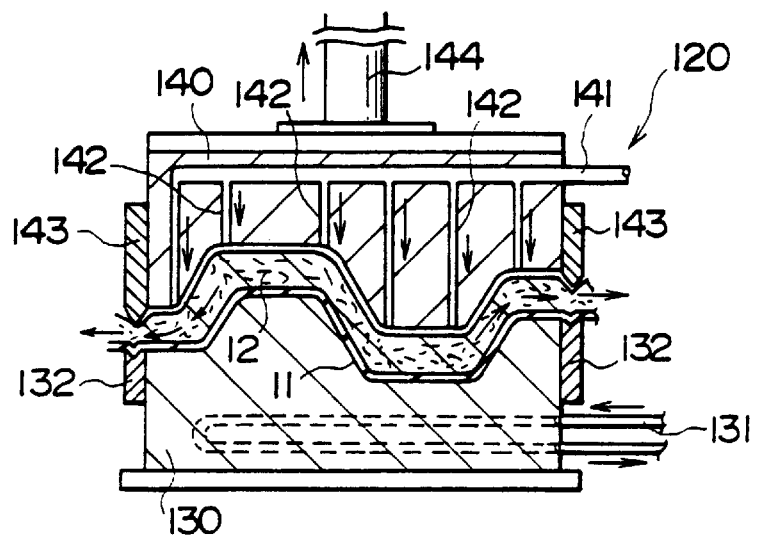
FIG. 16 is a section showing a cooling step of the sound absorption material according to the present invention.

With reference to FIG. 14 through FIG. 16, the molding method for the insulator dashboard 10 shown in FIG. 1 will be described in detail.

First, as shown in FIG. 14, a thermoplastic resin sheet S and a thermal-molding felt F of the materials for sound insulation material layer 11 and the sound absorption material layer 12 are placed on the cold-pressing-molding lower mold 130.

The thermoplastic resin sheet S and the thermal-molding felt F, respectively have been previously heated and softened, and surface temperature of the thermoplastic resin sheet S is 130 to 135° C. and that of the thermal-molding felt F is 165 to 175° C.

After completing the setting step of materials, elevating cylinder 144 operates to lower the cold-pressing-molding upper mold 140. Leaving predetermined clearance between cold-pressing-molding upper and lower molds 130 and 140, pressure of 15 to 30 kg/cm² is applied to them, pressing both the thermoplastic resin sheet S and the thermal-molding felt F.

In addition of such pressing operation, as shown in an enlarged view of FIG. 15, seal members 143 provided around the outer periphery of the upper mold 140 sandwich the thermoplastic resin sheet S and the thermal-molding felt F the sealing circumferences of these materials. As shown in FIG. 15 (as well as in FIGS. 4 and 9), the sealing members 143 (17, 46) seal thermal-molding felt and the thermoplastic resin sheet at about the outer periphery of the lower mold.

Then, keeping such sealed condition of the circumferences of these materials, compressed cooling air (pressure: 3 to 5 kg/cm²) is sprayed onto the thermal-molding felt F and thermoplastic resin sheet S from the air supply port 142 formed on the upper mold 140.

As a result, the whole surface of thermoplastic resin sheet S is pressed onto and come contact with the face of the lower mold 130 by pressure air functioned through the thermal-molding felt F. Thus, the thermoplastic resin sheet S can be precisely molded in a shape of the lower mold 130.

After the pressure air pressing step molds the sound insulation material layer 11 and the sound absorbing material layer 12 in a desired shape, the upper mold 140 is raised slightly as shown in FIG. 15, and sealed condition of seal member 143 to break the receiving seat 132 leaving passage or space through which air escapes to the outside. Cooling air from air supply port 142 is blown onto and into the sound absorbing material layer 12 through the air supply piping 141 in order to compulsorily exhaust heat from the sound absorption material layer 12 and sound insulation material layer 11 to the outside together with air.

As described above, the molding method according to the present invention consists of a setting step, a pressure air pressing step, and a cooling step, comparing to two pressing steps of the conventional molding method. As a result, it is possible to carry out one pressing step with low pressure without complicated pressure control operation. Additionally, it is possible to considerably shorten cooling cycle period advantageously.

Figure 17:
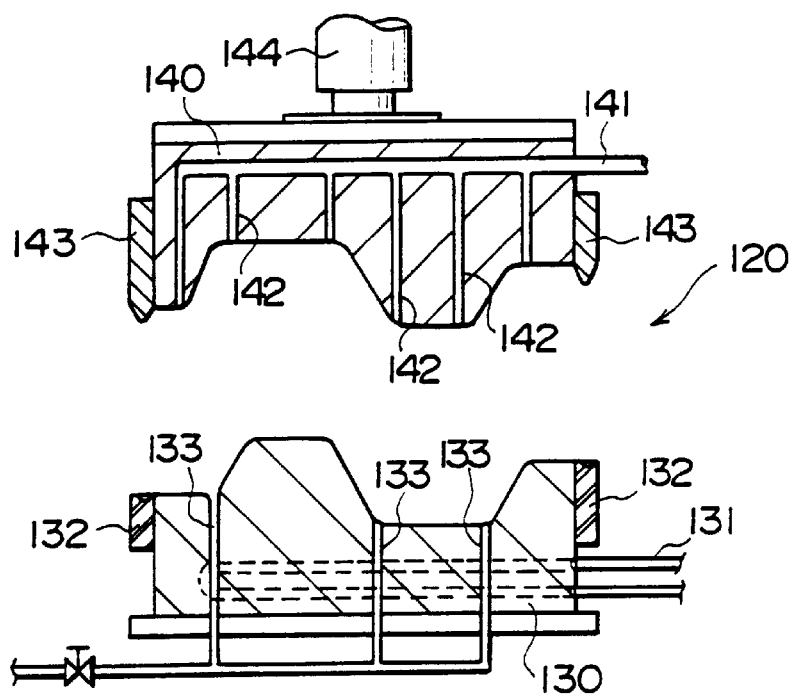
FIG. 17 is a section depicting a second embodiment of the molding apparatus according to the present invention.
Figure 18:
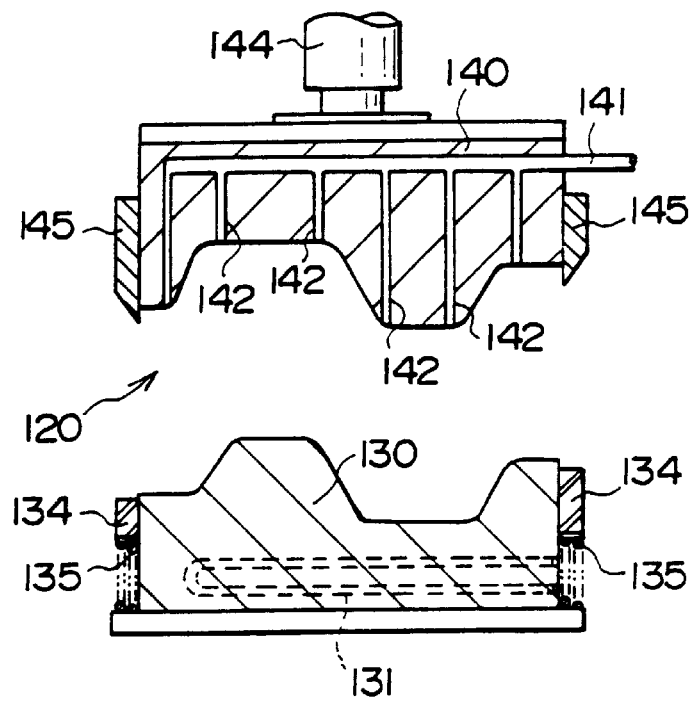
FIG. 18 is a section showing a third embodiment of the molding apparatus according to the present invention.
Figure 19:
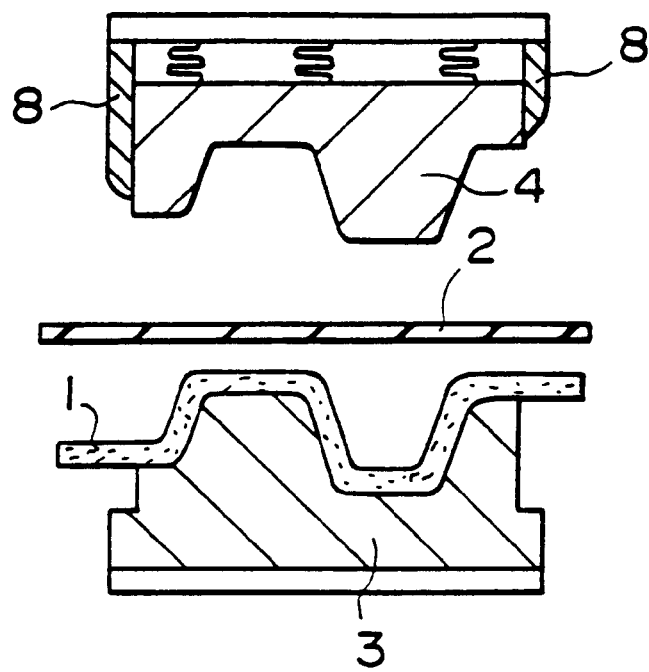
FIG. 19 is a section showing a material setting step on the press mold according to the prior art.
Figure 20:
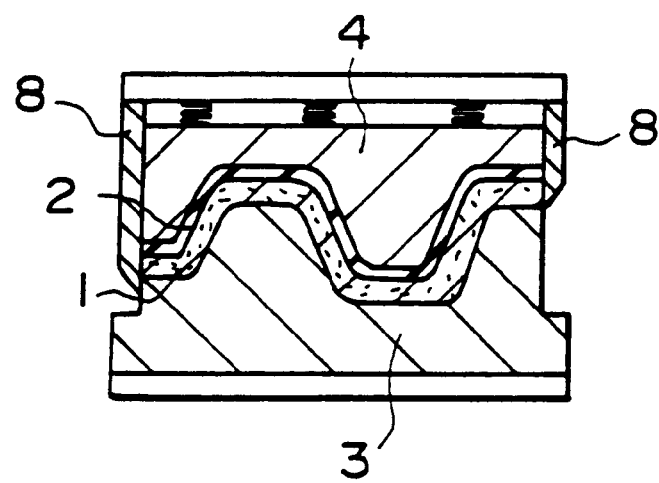
FIG. 20 is a section showing a pressing step according to the conventional molding method.

Next, the second and the third embodiments of the molding apparatus according to the present invention will be described with reference to FIG. 17 and FIG. 18. As shown in particular in FIG. 17, the cold pressing molding lower mold 130 has vacuum suction holes 133 formed thereon so as to function as a vacuum suction tool. When the sound insulation material layer 11 is pressed and molded by pressure air, vacuum suction functions to more shorten cooling cycle period expanding advantageously moldability of the sound insulator material layer 11.

As shown in FIG. 18a, trimming blade 145, in place of the wedge type seal member 143 of the first embodiment of the molding method, is provided on the outer periphery of the upper mold 140 as well as a sealing striper 134 provided on outer peripheral face of the lower mold 130 through a spring 135 so that after the sound suction material layer 12 is cooled, the upper mold 140 again lowers to trim the outer peripheral portion, easing trimming operation and piecing operation of the next step.

As described above, according to the molding method of the laminated molded body of the present invention, cooling air is supplied into the thermal-molding felt through pressure air holes or ports provided on the cold-pressing-molding lower mold in order to assist molding of the thermoplastic resin sheet and accelerate cooling of the thermal-molding felt.

The molding method of the laminated molded body of the present invention can make the sound insulation material come to in intimate contact with the face of the upper mold by means of vacuum suction holes formed on the upper mold.

Additionally, according to the molding method of the laminated molded body of the present invention, cooling air is supplied from a blowing pipe so as to make its front end protrude from the face of the lower mold to a thermal-molding felt, resulting in cooling air being supplied to a central portion of the felt. Thus, by cooling time for the thermal-molding felt is considerably shortened and molding of a thermoplastic resin sheet is accelerated. Consequently, the whole operation of molding is shorten very much.

Also, according to the molding method for laminated molded body of the present invention, air supplied into the thermal-molding felt through the blowing pipe intruded into the felt is recovered from not only the outer periphery of the felt but also through the vacuum suction holes formed on the lower mold advantageously further shortening thermal-molding felt.

According to the molding method of the present invention, the cold-pressing-molding upper mold is raised slightly after the molding is completed to break the sealing condition of the outer periphery of the upper and the lower molds and and cooling air is sent into the sound absorbing material layer through air supply ports or holes, thereby considerably shortening the cooling cycle time can and the molding time.

According to the molding apparatus of the laminated molded body of the present invention, the cold-pressing-molding lower mold has pressure air holes for accelerating cooling of the thermal-molding felt in order to supply cooling air into the thermal-molding felt through the pressure air holes and to accelerate cooling of the thermal-molding felt.

Also, the molding apparatus for laminated molded bodies has an upper mold provided with vacuum suction holes for vacuum-molding the thermoplastic resin sheet the sound insulation material intimately comes into vacuum-contact with face of the upper mold, assisting molding of the thermal-molding resin sheet.

According to molding apparatus for laminated molded bodies of the present invention, the blowing pipe is situated on the lower mold so as to make a front end of the pipe protrude from molding face of the lower mold and to supply cooling air into the thermal-molding felt. Consequently cooling air is supplied to the central portion of the thermal-molding felt, the cooling time of the thermal-molding felt is exceedingly shortened, molding of the thermoplastic resin sheet is assisted, and the whole molding time is shortened very much.

In accordance with the molding apparatus for laminated molded bodies, air supplied to the thermal-molding felt through the blowing pipe intruded or inserted into the interior of the felt is exchausted through the vacuum suction holes formed on the lower mold so that cooling time of thermal-molding felt is further shortened.

According to the molding apparatus for laminated molded bodies of the present invention, a plurality of assistant holes are formed on the side of the blowing pipe in order to forcibly cool the thermal-molding felt, resulting in high cooling efficiency of thermal-molding felt.

In addition, the molding apparatus of the present invention has trimming blade having functions of sealing, trimming, and cutting. The trimming, which blade is provided on outer periphery of cold-pressing-molding upper mold, simplifying the whole mold installation and lowering manufacturing and installation costs.

The preferred embodiments of the present invention have been described and it is understood that other embodiments and modifications can be made within the scope and sprit of the present invention.

What is claimed is:

1. A molding apparatus for a laminated molded body that includes a thermal-molding felt and a thermoplastic resin sheet, comprising:

a cold-pressing-molding lower mold provided with a predetermined mold face; and a cold-pressing-molding upper mold placed above said lower mold in order to press and mold the thermal-molding felt in a predetermined shape, while providing a predetermined clearance between the upper and lower molds, wherein the upper mold carries a movable sealing member for sealing the thermal-molding felt and the thermoplastic sheet at about the outer periphery of the lower mold, the movable sealing member being movable relative to the upper mold while maintaining the same predetermined clearance between the upper and lower molds to break the seal and permit air to escape through a portion of the thermal-molding felt extending to about or beyond the outer periphery of the lower mold to exhaust heat, and wherein one of the lower and upper molds has pressure air holes for delivering cooling and accelerating cooling of the thermal-molding felt, the one of the lower and upper molds having the pressure air holes is adapted to contact the thermal-molding felt so that the cooling air introduced through the pressure air holes penetrates into and through the thermal-molding felt to the thermoplastic resin sheet to force the thermoplastic resin sheet against the other of the lower and upper molds to more precisely mold the thermoplastic resin sheet against the other of the lower and upper molds.

2. The molding apparatus for a laminated body according to claim 1, wherein the other of the lower and upper molds has vacuum suction holes for vacuum-molding said thermoplastic resin sheet to even more precisely mold the thermoplastic resin sheet.

3. The molding apparatus for a laminated body according to claim 1, wherein the one of the lower and upper molds has a blowing pipe extending from a mold face thereof and is adapted to penetrate into the thermal-molding felt when the laminated molded body is pressed.

4. The molding apparatus for a laminated body according to claim 3, wherein said blowing pipe includes a plurality of supplemental or assisting holes for forcibly cooling the thermal-molding felt.

5. The molding apparatus for a laminated body according to claim 3, wherein the other of the lower and upper molds has a plurality of vacuum suction holes for exhausting air supplied from the blowing pipe.

6. The molding apparatus for a laminated molded body according to claim 5, wherein said blowing pipe includes a plurality of supplemental or assisting holes for forcibly cooling the thermal-molding felt.

7. The molding apparatus for a laminated body according to claim 1, further including an air pump for providing pressurized air to the pressure air holes.

* * * * *